3,007,976
PROCESS FOR THE PRODUCTION OF 6-(2',6',6'-TRIMETHYL-CYCLOHEXENYL-1')-4-METHYL-HEXA-3,5-DIENE-1-YNE
Karl Eiter, Koln-Stammheim, and Ernst Truscheit, Leverkusen, Germany, assignors to Farbenfabriken Bayer Aktiengesellschaft, Leverkusen, Germany, a corporation of Germany
No Drawing. Filed Mar. 24, 1960, Ser. No. 17,258
Claims priority, application Germany Mar. 28, 1959
7 Claims. (Cl. 260—666)

The present invention relates to a process for the production of 6-(2',6',6'-trimethyl-cyclohexenyl-1')-4-methyl-hexa-3,5-diene-1-yne by reacting β-ionone with a 1,3-dihalogeno-1-propene to form a 6-(2',6',6'-trimethyl-cyclohexenyl - 1') - 4 - methyl - 4 - hydroxy - 1 - halogeno-hexa-1,5-diene, splitting off hydrogen halide from the latter compound to obtain 6-(2',6',6'-trimethyl-cyclohexenyl-1')-4-methyl-4-hydroxy-hex-5-ene-1-yne and subsequently splitting off water from this compound.

It is known that 6-(2',6',6'-trimethyl-cyclohexenyl-1')-4-methyl-hexa-3,5-diene-1-yne can be obtained by reacting β-ionone with propargyl bromide and zinc under the conditions of the Reformatsky reaction (Swiss patent specifications Nos. 250,658 and 258,514). When these processes are used, however, only very poor yields of 6-(2',6',6' - trimethyl-cyclohexenyl-1')-4-methyl-4-hydroxy-hex-5-ene-1-yne are obtained, since the β-ionone is only partially reacted and the unreacted β-ionone must be separated from the reaction mixture by complicated methods. In addition, the use of propargyl compounds in relatively large quantities is dangerous because of the tendency of these compounds to explosive self-decomposition (Explosivstoffe, vol. 4 (1956) No. 10, pages 233–235).

It is also known that water can be split off from 6-(2',6',6' - trimethyl - cyclohexenyl - 1') - 4 - methyl - 4-hydroxy-hex-5-ene-1-yne with oxalic acid (O. Isler, Chimia, vol. 3 (1949) 150; H. H. Inhoffen, H. Pommer and E. G. Meth, Liebigs Annalen der Chemie, vol. 569 (1950), 74–80), to give a hydrocarbon having the molecular formula $C_{16}H_{22}$ and a melting point of 49° C. This hydrocarbon was assumed to have the structural formula of 6-(2',6',6'-trimethyl-cyclohexenyl-1')-4-methyl-hexa-3,5-diene-1-yne (Formula I).

Experiments have, however, clearly shown that the aforementioned hydrocarbon is an isomer of 6-(2',6',6'-trimethyl-cyclohexen-2'-ylidene)-4-methyl-hex-4-ene-1-yne (Formula II). This is confirmed by the infra-red absorption spectrum of the hydrocarbon having a melting point of 49° C. The infra-red absorption spectrum shows a maximum at 2125 cm.$^{-1}$, which is characteristic of an α,β-saturated —C≡C— bond, while there is no absorption at 968 cm.$^{-1}$, which is characteristic of a symmetrically disubstituted bond.
$\overset{|}{C}H=CH$—trans-ethylene

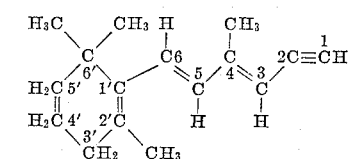

I

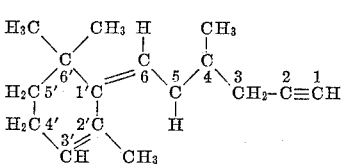

II

The compound of Formula II, however, belongs to the so-called "Retro series," and consequently is of no importance for the synthesis of vitamin A and β-carotene.

It has now been found that 6-(2',6',6'-trimethyl-cyclohexenyl-1')-4-methyl-hexa-3,5-diene-1-yne can be prepared in a technically simple and safe manner if, in a first stage, β-ionone is reacted in a manner known per se with a 1,3-dihalogeno-1-propane in the presence of zinc, lithium or preferably magnesium in an inert solvent, and the resulting 6 - (2',6',6' - trimethyl - cyclohexenyl - 1')-4-methyl-4-hydroxy-1-halogeno-hexa-1,5-diene is treated in a second stage with a nucleophilic reagent to split off hydrogen halide therefrom without first purifying the 6-(2',6',6' - trimethyl - cyclohexenyl - 1') - 4 - methyl - 4-hydroxy-1-halogeno-hexa-1,4-diene. Water is split off from the 6-(2',6',6'-trimethyl-cyclohexenyl-1')-4-methyl-4-hydroxy-hex-5-ene-1-yne thus obtained with an inorganic acid halide in the presence of an organic base in a third stage of the process according to the invention in a manner known per se.

It was surprising that in the first stage of the process according to the present invention, only the halogen atom of the 1,3-dihalogeno-1-propene which is in the 3-position, i.e. in the allyl position to the double bond reacts with the β-ionone. The formation of vinyl metal halides is known from the literature (Journal of Organic Chemistry, vol. 22 (1957), pages 1602–1605) and it was consequently to be expected that the halogen atom in the 1-position, i.e. the halogen atom on the double bond, would also react. In this case, the reaction could not have been controlled and would have given rise to different types of end products.

It was furthermore surprising that the splitting off of water in the third stage of the process according to the present invention gives rise to 6-(2',6',6'-trimethyl-cyclohexenyl-1')-4-methyl-hexa-3,5-diene-1-yne of Formula I, and not 6 - (2',6',6' - trimethyl - cyclohexenylidene - 2')-4-methyl-hex-4-ene-1-yne of Formula II. This is in contrast to the process of O. Isler (Chimia, vol. 3, 1949, 150), H. H. Inhoffen and others (Liebigs Annalen der Chemie, vol. 569 (1950), 74–80). The structural formula of the compound obtained by the process according to the invention is confirmed by its infra-red absorption spectrum (see Example 1).

As 1,3-dihalogeno-1-propenes there may be employed in the process according to the invention 1,3-dibromo-1-propene, 1,3-dichloro-1-propene, 1-bromo-3-chloro-1-propene and 1-chloro-3-bromo-1-propene. The dihalogeno propenes are prepared in known manner. For example, 1-chloro-3-bromo-1-propene is obtained in good yield by the Ziegler bromination of 1-chloro-1-propene in a pressure vessel (see Example 1).

It is preferable to employ the 1,3-dihalogeno-1-propene in excess, for example in an amount of from 1.2 to 1.5 mols per mol of β-ionone. The metal (zinc, lithium or preferably magnesium) is employed in an equimolar quantity with respect to the 1,3-dihalogeno-1-propene.

The first stage of the process according to the present invention is preferably carried out in the presence of an inert solvent. As inert solvent there may be employed tetrahydrofuran, dioxane, benzene or a mixture of any of these solvents and ether. The reaction temperature is determined by the boiling point of the reaction mixture. It is preferable to carry out the reaction under nitrogen and in the presence of an anti-oxidizing agent, such as phenothiazine.

The first stage of the process according to the present invention may be carried out by dissolving the β-ionine in a portion of the solvent and adding the metal and anti-oxidizing agent to the resulting solution. The mixture is then heated to boiling point and the 1,3-dihalogeno-1-propene in the remainder of the solvent is added dropwise to the boiling mixture. After the reaction has started the rate of addition of the 1,3-dihalogeno-1-propene is so adjusted that the reaction mixture boils without external heating.

The first stage of the process according to the present invention may also be carried out by mixing the β-ionone, 1,3-dihalogeno-1-propene, anti-oxidizing agent and solvent and adding a portion of the mixture to the metal. The mixture is then heated until the reaction starts and then, without external heating, the remainder of the mixture of β-ionone, 1,3-dihalogeno-1-propene, anti-oxidizing agent and solvent is run in as the reaction proceeds. The mixture is further heated for a short time after the reaction has subsided in order to achieve complete conversion.

The resulting reaction mixture is decomposed in the cold with aqueous ammonium chloride solution or with a dilute aqueous acid, such as hydrochloric acid, sulfuric acid, phosphoric acid and acetic acid. The reaction product is extracted with an organic solvent. The solution is then dried and the solvent evaporated off. The reaction product is then ready for use in the second stage of the process according to the present invention.

In the second stage of the process according to the present invention, hydrogen halide is split off from the 6 - (2',6',6'-trimethyl-cyclohexenyl-1') - 4-methyl-4-hydroxy - 1-halogeno-hexa - 1,5-diene with a nucleophilic reagent to give 6-(2',6',6'-trimethyl-cyclohexenyl-1')-4-methyl-4-hydroxy-hex-5-ene-1-yne. This stage of the process may be carried out with an alcoholic solution of an alkali metal hydroxide, with a solution of an alkali metal or alkaline earth metal alkoxide in absolute methanol or ethanol, with a solution of an alkali metal in liquid ammonia or with a solution of an alkali metal amide in an inert solvent, such as absolute ether, tetrahydrofuran or benzene. The temperatures to be used are determined by the boiling points of the solvents employed. Reaction temperatures of from −30° C. to +100° C. are generally employed in the second stage of the process.

The nucleophilic reagent is employed in an amount of from 1 to 3 mols per mol of 6-(2',6',6'-trimethyl-cyclohexenyl-1')-4-methyl-4-hydroxy - 1 - halogeno - hexa-1,5-diene.

In carrying out the second stage of the process according to the present invention, a solution of 6-(2',6',6'-trimethyl-cyclohexenyl-1') -4-methyl-4-hydroxy-1-halogeno-hexa-1,5-diene in absolute alcohol may be heated to boiling point with an alkali metal or an alkaline earth metal alkoxide in the presence of an anti-oxidizing agent and in an inert gas atmosphere for from 1 to 2 hours. The alcohol is then evaporated off and the residue is taken up in an organic solvent which is immiscible with water. The solution extract is finally washed until neutral.

An alkali metal or alkaline earth metal amide may be employed in the second stage of the process according to the present invention instead of the alkali metal or alkaline earth metal alkoxide. In this case an inert solvent, such as absolute ether, tetrahydrofuran, dioxane or benzene, is employed as solvent instead of an alcohol.

The second stage of the process according to the present invention may also be carried out by dissolving the 6-(2',6',6'-trimethyl-cyclohexenyl-1') - 4-methyl-4-hydroxy-1-halogeno-hexa-1,5-diene in an inert solvent and adding the resulting solution to a solution of an alkali metal or alkaline earth metal in liquid ammonia at a temperature of from −60° C. to −30° C. The resulting mixture is left for some hours at this temperature, solid ammonium chloride is then added to the solution to decompose the organometallic compound which has formed and, after evaporating off the ammonia, the further procedure is as described above.

In the third stage of the process according to the present invention water is split off from the 6-(2',6',6'-trimethyl-cyclohexenyl-1') - 4-methyl-4-hydroxy-hex-5-ene-1-yne to form 6-(2',6',6'-trimethyl - cyclohexenyl-1') - 4-methyl-hexa-3,5-diene-1-yne. An inorganic acid halide in the presence of an organic base and if necessary in the presence of an inert solvent is preferably employed for splitting off water from the 6-(2',6',6'-trimethyl-cyclohexenyl-1')-4-methyl-4-hydroxy-hex-5-ene-1-yne.

The solution resulting from the second stage of the process according to the present invention is dried, the solvent evaporated off and the residue taken up in an inert solvent of relatively high boiling point, such as benzene, toluene, carbon tetrachloride or petroleum ether. An anti-oxidizing agent is added to the solution which is then reacted, in the presence of pyridine, quinoline, diethylaniline, N-phenyl-morpholine or triethylamine, with from 1 to 1.5 mols of phosphorus trichloride, phosphorus tribromide, phosphorus pentachloride, phosphorus oxychloride or thionyl chloride per mol of 6-(2',6',6'-trimethylcyclohexenyl-1') - 4-methyl-4-hydroxy - hex-5-ene-1-yne. The reaction is preferably carried out at an elevated temperature, preferably of from 80 to 100° C. with exclusion of moisture and oxygen. The 6-(2',6',6'-trimethyl-cyclohexenyl-1')-4-methyl-hex-3,5-diene-1-yne is isolated by decomposing the reaction mixture with iced water, separating out basic and acid constituents and evaporating the solvent.

The 6 - (2',6',6' - trimethyl-cyclohexenyl-1')-4-methyl-hexa-3,5-diene-1-yne thus obtained is an important intermediate for the synthesis of vitamin A β-carotene and carotenoids.

EXAMPLE (a) 1-chloro-3-bromo-1-propene 57.3 parts by weight of 1-chloro-1-propene in 20 parts by volume of absolute carbon tetrachloride and 89 parts by weight of N-bromosuccinimide are heated in a pressure vessel for 10 hours at 80–100° C. After the reaction has taken place, the mixture is cooled to 0° C., the succinimide is filtered off with suction and washed with cold carbon tetrachloride. The filtrate is carefully extracted by shaking it three times with iced water, the organic phase is dried and is fractionated in vacuo after separation from carbon tetrachloride and unreacted starting material. The 1-chloro-3-bromo-1-propene distils over at 61–77° C. at a pressure of 50 mm. Hg as a crystal-clear liquid which causes strong lacrimatory irritation. $n_D^{320}=1.5175$. The yield of 1-chloro-3-bromo-1-propene is about 60%, based on the 1-chloro-1-propene.

(b) 6-(2',6',6'-trimethyl-cyclohexenyl-1')-4-methyl-4-hydroxy-1-bromohexa-1,5-diene 3.2 parts by weight of magnesium chips wtih some elementary iodine and 2 parts by volume of absolute ether are placed in a three-necked flask provided with a dropping funnel, a thermometer, a stirrer and a condenser. The flask is flushed with dry nitrogen gas and a solution of 19.2 parts by weight of β-ionone and 0.1 part by weight of phenothiazine in 28 parts by volume of absolute tetrahydrofuran is added. The mixture is heated to about 70° C. while stirring and a solution of 26 parts by weight of 1,3-dibromo-1-propene in 20 parts by volume of tetrahydrofuran is added dropwise. A violent reaction starts immediately. The solution of the halogen components is added dropwise at such a rate as to maintain the temperature at 70° C. without external heating. After all the halogen component has been introduced, the mixture is heated for a further 5 to 10 minutes under reflux. It is then cooled to 0° C. and the contents of the flask are decomposed with a cold aqueous ammonium chloride solution. The reaction product is shaken with ether, the ethereal solution is washed with water until neutral, dried over sodium sulfate and, after filtering, the ether is evaporated. 31 parts by weight of a thick, light yellow oil remain. This oil may be employed in the next stage of the process without further purification.

An equally high yield of 6-(2'-6',6'-trimethyl-cyclohexenyl-1') - 4 - methyl - 4 - hydroxy-1-chlorohexa-1,5-diene is obtained by employing 1 - chloro - 3 - bromo - 1 - propene instead of the 1,3-dibromo-1-propene.

(c) *6-(2',6',6'-trimethyl-cyclohexenyl-1')-4-methyl-4-hydroxy-hex-5-ene-1-yne*

29 parts by weight of crude 6 - (2',6',6' - trimethyl-cyclohexenyl - 1') - 4 - methyl - 4 - hydroxy-1-bromohexa-1,5-diene are introduced into a stirrer-type apparatus provided with a gas inlet pipe and a condenser and dissolved under nitrogen in 20 parts by volume of ethanol. 0.2 part by weight of phenothiazine is added to the resulting solution. A solution of 3.2 parts by weight of metallic sodium in 50 parts by volume of absolute ethanol is allowed to flow into the aforementioned solution. The mixture is then heated for 2 hours under reflux. The excess ethanol is substantially evaporated in vacuo, the residue is taken up with ether and the ethereal phase is washed with sodium bicarbonate solution until neutral and thereafter with water. 20 parts by weight of an orange-red, thick oil are obtained after drying the solution and evaporating off the solvent. The oil is distilled under high vacuum. The hydroxyacetylene product is obtained in the form of a colourless, thickish oil at a pressure of 0.001 mm. Hg and an air bath temperature of 100–120° C. The product has a refractive index $n_D^{20}$ of 1.5050. The ultra-violet spectrum of the product shows a $\lambda_{max}$ of 233 m$\mu$ ($\epsilon$=5600), while the infra-red spectrum shows an OH band at 3390 cm.$^{-1}$, the —C≡C—H band at 3280 cm.$^{-1}$, the $\alpha,\beta$-saturated C≡C band at 2108 cm.$^{-1}$, and the disubstituted

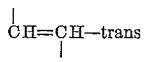

band at 970 cm.$^{-1}$.

*Analysis.*—$C_{16}H_{24}O$ molecular weight 232.37. Calculated: C, 82.70; H, 10.41. Found: C, 82.10; H, 10.34.

For splitting off the hydrogen bromide, it is also possible to proceed as follows:

250 parts by volume of liquid ammonia are introduced into a stirrer-type apparatus provided with a dropping funnel, a gas-venting tube and a thermometer. Ferric nitrate is added to the liquid ammonia at approximately —60° C., while stirring and air is blown through for 2 minutes. 6 parts by weight of metallic sodium are then introduced in small pieces and the mixture is stirred for about 8 hours. Thereafter, a solution of 20 parts by weight of crude 6-(2',6',6'-trimethyl-cyclohexenyl-1')-4-methyl-4-hydroxy-1-bromohexa-1,5-diene in 30 parts by volume of absolute ether is slowly added and the mixture is stirred for another 5 hours. 20 parts by weight of solid ammonium chloride are then introduced and the excess ammonia is evaporated at —30° C. while stirring and passing through nitrogen. Water is added to the residue, which is extracted with ether, the ethereal phase is washed until neutral, the ether solution is dried and the solvent evaporated. 13.8 parts by weight of a dark, thick oil remain, which distils over on being distilled under high vacuum at an air bath temperature of 90–110° C. The colourless distillate is 6-(2',6',6' - trimethyl-cyclohexenyl - 1') - 4-methyl-4-hydroxy-hex-5-ene-1-yne and possesses the aforementioned physical and chemical properties.

(d) *6-(2',6',6'-trimethyl-cyclohexenyl-1')-4-methyl-hexa-3,5-diene-1-yne*

Using a stirrer-type apparatus, 22 parts by weight of 6 - (2',6',6' - trimethyl-cyclohexenyl-1')-4-methyl-4-hydroxy-hex-5-ene-1-yne, 22 parts by weight of absolute pyridine and 0.1 part by weight of phenothiazine are dissolved in 70 parts by volume of absolute benzene in a nitrogen atmosphere. The solution is cooled to 0° C. and after reaching this temperature, a solution of 6.5 parts by weight of phosphorus trichloride in 12 parts by volume of absolute benzene is added dropwise while stirring. The mixture is stirred for 1 hour at room temperature after all the phosphorus trichloride solution has been introduced. The mixture is then heated for another hour under reflux. The reaction mixture is then cooled and ether is added thereto. The contents of the vessel are then carefully decomposed with ice. The organic phase is now separated, washed with water, dilute sulfuric acid and water as well as sodium bicarbonate solution and water. The organic phase is dried over sodium sulfate, filtered and the solvent mixture is evaporated under reduced pressure. 18.3 parts by weight of residue remain, which yields a golden-yellow oil on being distilled under high vacuum. The oil distils over at 80–90° C. and 0.001 mm. Hg. The oil becomes darker in colour after being stored for a short time, even in a closed vessel. The ultra-violet absorption spectrum shows an absorption at 283 m$\mu$ ($\epsilon$=23000), while the infra-red absorption spectrum shows inter alia a band at 2080 cm.$^{-1}$, which is characteristic of the $\alpha,\beta$-unsaturated —C≡C— bond, as well as a pronounced band at 965$^{-1}$, which is characteristic of a symmetrically disubstituted

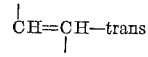

ethylene bond.

*Analysis.*—$C_{16}H_{22}$ molecular weight 214.36. Calculated: C, 89.65%; H, 10.35%. Found: C, 88.82%; H, 10.41%.

We claim:

1. A process for the preparation of 6-(2',6',6'-trimethyl-cyclohexenyl-1')-4-methyl-hexa-3,5-diene-1-yne, which comprises reacting in an inert solvent $\beta$-ionone in the presence of a metal selected from the group consisting of zinc, lithium and magnesium with 1,3-dihalogeno-1-propene to produce 6-(2',6',6'-trimethylcyclohexenyl-1')-4-methyl-4-hydroxy-1-halogeno-hexa-1,5-diene, reacting the product thus obtained with a nucleophilic agent under splitting off of hydrogen halide to produce 6-(2',6',6'-trimethylcyclohexenyl-1') - 4 - methyl-4-hydroxy-hex-5-ene-1-yne, treating in the presence of an organic base the product thus obtained with an inorganic acid halide whereby water is split off to produce 6-(2',6',6'-trimethyl-cyclohexenyl-1')-4-methyl-hexa-3,5-diene-1-yne.

2. A process according to claim 1, which comprises effecting the reaction under exclusion of oxygen and in the presence of an anti-oxidizing agent.

3. A process according to claim 1, which comprises effecting the reaction of the 6-(2',6',6'-trimethyl-cyclohexenyl - 1') - 4-methyl-4-hydroxy-1-halogeno-hexa-1,5-diene with said nucleophilic agent in an anhydrous medium.

4. A process according to claim 1, which comprises effecting the treatment whereby water is split off from the 6 - (2',6',6'-trimethylcyclohexenyl-1')-4-methyl-4-hydroxy-hex-5-ene-1-yne with phosphorus trichloride in the presence of pyridine and of an inert solvent.

5. A process according to claim 1, which comprises utilizing in the reaction from 1.2 to 1.5 mols of 1,3-dihalogeno-1-propene per mol of $\beta$-ionone.

6. A process according to claim 1, wherein said anti-oxidizing agent is phenothiazine.

7. A process according to claim 1, wherein the nucleophilic agent is a member selected from the group consisting of alkali metal hydroxides, alkali metal alkoxides, alkaline earth metal alkoxides, alkali metal amines and alkali metals.

References Cited in the file of this patent

UNITED STATES PATENTS

| | | |
|---|---|---|
| 2,540,116 | Huber et al. | Feb. 6, 1951 |
| 2,857,423 | Isler et al. | Oct. 21, 1958 |

UNITED STATES PATENT OFFICE
CERTIFICATION OF CORRECTION

Patent No. 3,007,983                      November 7, 1961

Frank A. Clauson

It is hereby certified that error appears in the above numbered patent requiring correction and that the said Letters Patent should read as corrected below.

Column 7, line 14, for "debutanizer" read -- deisobutanizer --; column 7, line 19, for "tray of a deisobutanizer. This stream comprises 6 percent" read -- prises 1 percent propane, 71 percent isobutane, 9 percent --.

Signed and sealed this 10th day of April 1962.

(SEAL)
Attest:

ERNEST W. SWIDER
Attesting Officer

DAVID L. LADD
Commissioner of Patents